United States Patent Office 3,206,720
Patented Sept. 14, 1965

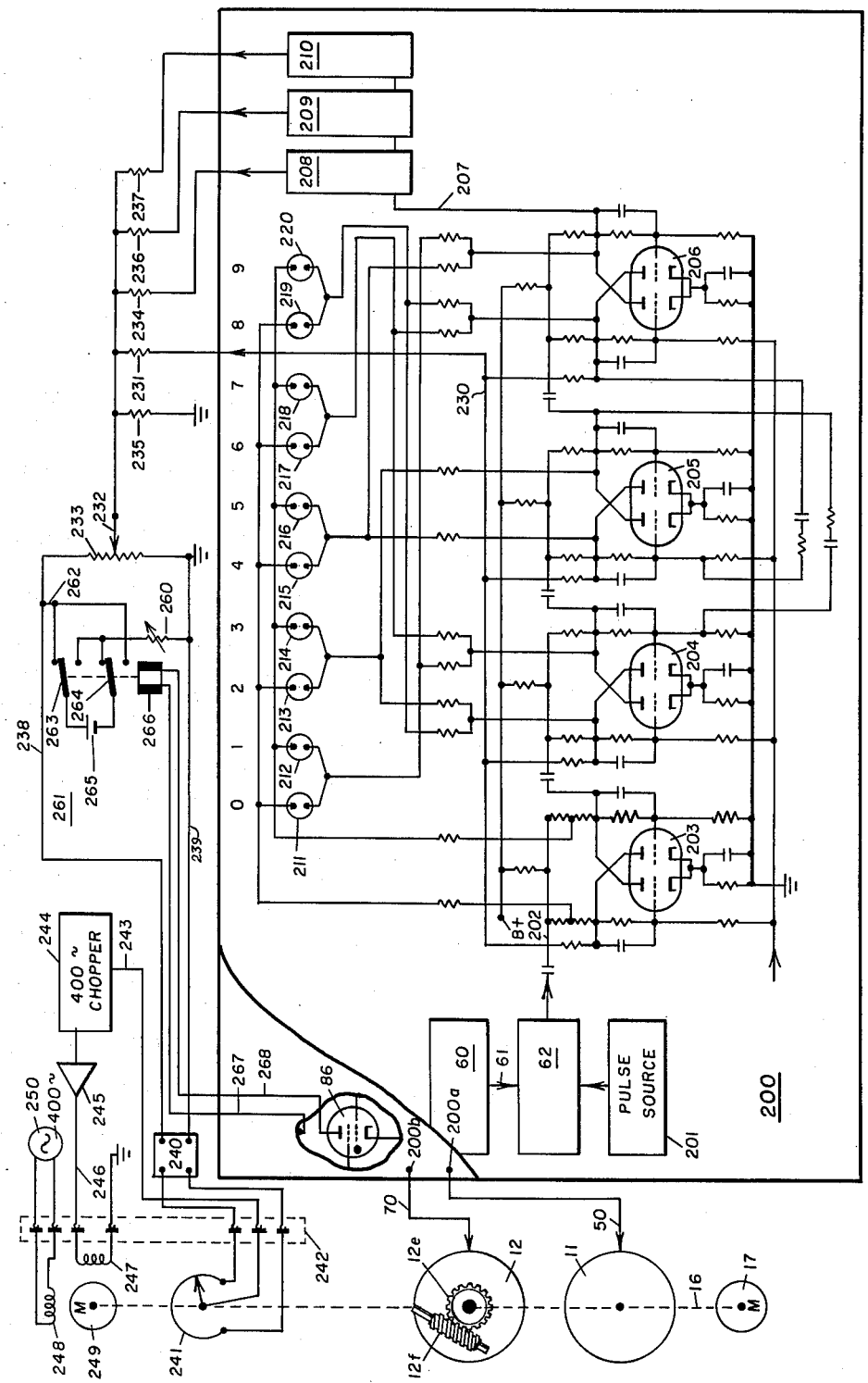

3,206,720
PLAYBACK TIME ALIGNMENT OF SEISMOGRAMS
Robert B. Kerr, Dallas, Tex., assignor to Socony Mobil Oil Company, Inc., a corporation of New York
Filed Dec. 17, 1959, Ser. No. 860,119
8 Claims. (Cl. 340—15.5)

This invention relates to seismic exploration and more particularly to the alignment in time of the initial markers for simultaneous reproduction of a plurality of seismograms.

Many areas in which seismic exploration is conducted prove to be most difficult with usable data rarely being obtained. Seismic field procedures which ordinarily prove wholly satisfactory fail or are substantially ineffective in some areas such as are characterized by unconsolidated or high velocity surface layers or extremely variable weathered layers. It has been found possible to enhance the quality of seismic records in such areas by producing a plurality of records at a given location in such a manner that they may be combined to form a single record or a plurality of combined records, the signals being composited in such a manner as to cancel or reduce noise components and to enhance signal components. In application Serial No. 830,289, filed July 29, 1959, for Ehlert et al., co-workers of applicant, there is illustrated a system in which tens or hundreds of field seismograms are composited to form a single final recording. As a general rule where two seismic signals from separate seismic recordings are to be combined, it is necessary accurately to align the initial markers or time breaks on the two seismograms. This is necessary even though they are recorded on identical time scales so that desired signal components from both seismograms will be combined in a precise phase relationship. Otherwise, desired signal components may be canceled or subdued and the improvement sought from compositing operations will not be achieved.

It is an object of the present invention to provide an indication as to the degree of alignment between seismograms in order to facilitate precise alignment.

More particularly, in accordance with one aspect of the invention where a pair of seismic signals separately recorded on related time bases together with initial timing markers are to be simultaneously reproduced and composited to form a single seismic signal, there is provided a system for determining time coincidence between the timing markers which comprises a reproducing means for cyclically generating a first signal representative in time of the timing marker associated with one of said seismic signals and for generating a second signal representative in time of the timing marker associated with the second of said seismic signals. A timing circuit is connected to the aforesaid generating means and is responsive to the first and second signals for generating a condition proportional to the time interval between the first and second signals. Means is then provided for registering the magnitude of the condition to provide an indicia for adjustment between the two seismic signals for alignment of the time breaks.

In a further aspect of the invention, a time counter system scaled in a manner related to the time scale of the seismic signals is selectively actuated and de-actuated by the two time break signals together with a key circuit to indicate which of the two signal actuates the timing counter.

In accordance with a further aspect of the invention, a timing system is employed for developing a condition proportional to the interval between time break signals on a pair of seismograms and for energizing an actuating member for automatically shifting one of the two seismic signals along the time scale relative to the other for alignment of the time breaks.

For further objects and advantages of the invention reference may now be had to the following description taken in conjunction with the accompanying drawings in which:

FIG. 3 illustrates automatic time adjustment.

Figure 1:
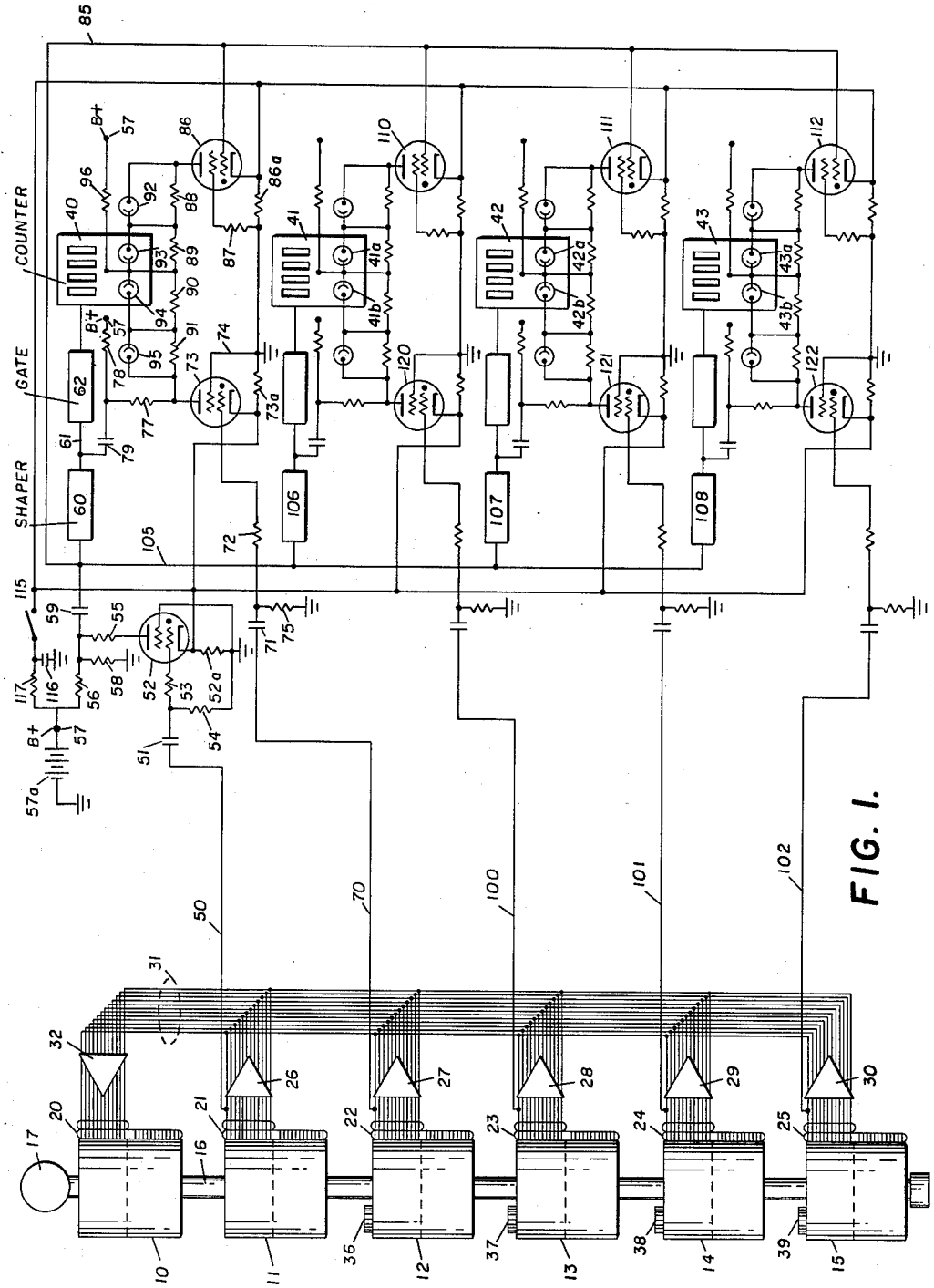
FIG. 1 is a detailed representation of a first modification of the invention.

Referring now to FIG. 1, there is illustrated the seismic data processing system in which a plurality of recording-playback units including record transports or drums 10, 11, 12, 13, 14, and 15 for multichannel magnetic recordings are illustrated as mounted on a common shaft 16 and are driven by a motor 17. Drum 10 is illustrated as a recording drum and drums 11–15 are playback drums. magnetic tapes forming reproducible seismograms are mounted on each of drums 11–15 and are cyclically driven past multichannel playback or detector heads 21, 22, 23, 24, and 25. The seismic signals thus reproduced are applied to multichannel amplifier units 26–30 whose outputs are combined in channels 31 and applied through multichannel amplifier unit 32 to recording head 20 on the recording drum 10. By this means a composite seismogram is recorded on drum 10.

It is to be understood that seismograms placed on drums 11–15 are multitrace, reproducible seismic recordings. In the specific embodiment the drums 11–15 represent those capable of accommodating seismic records having twenty-four traces or twenty-four channels thereon. The amplifiers 26–30 are illustrated as connected to the upper twelve channels on each of the seismograms. Each of twelve signals from each seismogram is then combined with corresponding signals from the other seismograms for recording on drum 10.

It is to be understood that in the foregoing operations signals recorded on the upper channel of the records on drums 11–15 are combined and recorded on the upper channel on the magnetic recording medium on drum 10. Similarly, the remaining signals are combined so that the recording on drum 10 is a multitrace seismogram, each trace representing the composite of five separate seismic signals.

A time break signal or other initial timing marker is conventionally recorded on each of the records on drums 11–15 as the original seismic data are produced in the field. The time break signal is recorded either on a separate channel or on one of the seismic signal channels. In the present case, it will be assumed that the time break signal is recorded on the top channel of each of the records on drums 11–15.

Figure 2:
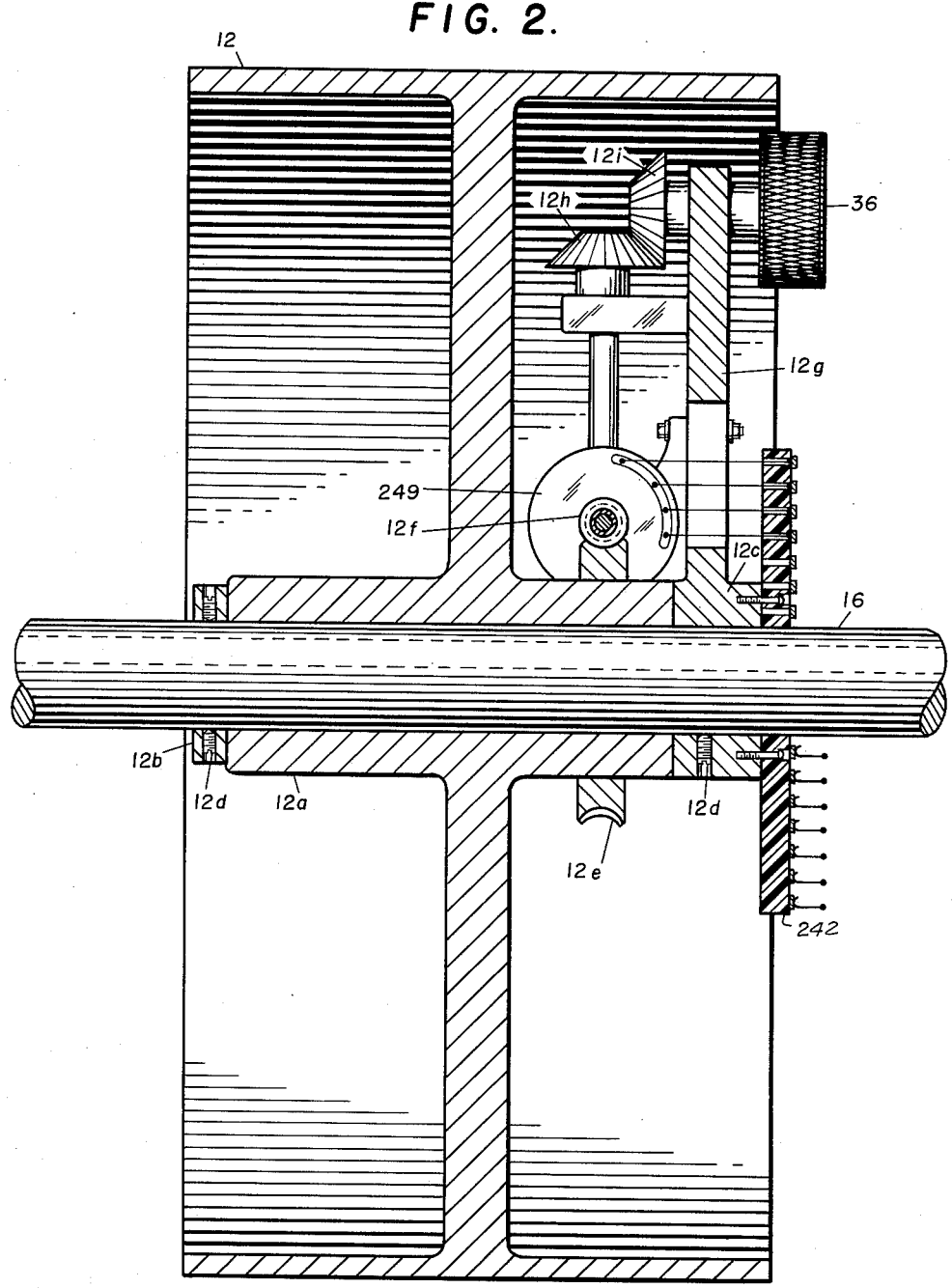
FIG. 2 is a sectional view on an enlarged scale of an adjustable drum.

In accordance with one aspect of the present invention, drums 10 and 11 are secured in fixed relation on the shaft 16. In contrast, drums 12–15 are relatively adjustable through manual operation of adjusting knobs 36, 37, 38, and 39. More particularly, the adjusting mechanism may be such as shown in FIG. 2 where drum 12 is illustrated in a sectional view. Drum 12 with its central bearing 12a is positioned on shaft 16 between bosses 12b and 12c. The bosses 12b and 12c are secured to shaft 16 by means of set screws 12d. A ring gear 12e is carried by drum 12. In the embodiment illustrated, ring gear 12e is mounted on the bearing portion 12a. A worm gear 12f engages ring gear 12e and is mounted on a shaft supported by a mounting element 12g. Gear 12f is mechanically coupled to gears 12h and 12i which in turn are coupled to the adjusting knob 36. Manual rotation of knob 36 will rotate the worm gear 12f thereby rotating drum 12 relative to shaft 16. The worm gear 12f may also be coupled by a suitable means to a motor such as motor 249 later to be described in connection with automatic adjustments. For purposes of the immediate description, however, it is to be understood that a connection between drums 13–15 and knobs 37–39, respectively, may be provided similar to that illustrated in FIG. 2. By this means, slight adjustment either manual or automatic as hereinafter described may be effected to bring into accurate alignment the seismic signals recorded on all of drums 11–15 so that they may be properly combined for recording on drum 10.

It is generally considered necessary to align the seismic signals to within one millisecond in time. This limit has been established through the practice of recording seismic waves of such frequency content and on such time scale as to permit resolution of the time occurence of a given seismic event to within a time interval of one millisecond. In practice the seismograms cannot be placed on drums 11–15 (FIG. 1) with any exact or known relationship between the time breaks recorded thereon though the approximate location on a magnetic tape of the time break is known. Thus, it is necessary to provide an indication whereby suitable corrective adjustment may be made in the rotational position of drums 12–15 in order to bring the records into exact alignment. In accordance with the present invention an indication is provided on a plurality of counters such as counters 40–43. Not only is an indication provided as to magnitude of the time difference between the time break on the seismogram on drum 11 and on the remaining drums but also an indication as to whether or not this time difference is positive or negative in sense. More particularly, the reference timing pulse generated in predetermined time relation with respect to the position of the time break on the seismogram on drum 11 is applied by way of channel 50 and coupling condenser 51 to the control grid of a first controller which may be a thyratron 52. Thyratron 52 is provided with a resistor 53 in series with the control grid and a grid-to-ground resistor 54. The screen grid of the thyratron 52 is connected directly to ground and the cathode of tube 52 is connected to ground by way of resistor 52a. The anode of tube 52 is connected by way of resistors 55 and 56 to the positive terminal 57 of a suitable plate supply source such as battery 57a. The juncture between resistors 55 and 56 is connected to ground by way of resistor 58. The same juncture also is connected by way of capacitor 59 to the input terminal of a pulse shaper 60. The output of pulse shaper 60 is connected by way of conductor 61 to a control gate circuit 62 which is adapted to control the pulse counter 40.

In a similar manner the timing signal generated from the seismogram on drum 12 is applied by way of channel 70, coupling condenser 71 and resistor 72 to the control grid of a second thyratron 73. The screen grid of tube 73 is connected to ground by way of conductor 74. The cathode of tube 73 is also connected to ground by way of resistor 73a. The juncture between condenser 71 and resistor 72 is connected to ground by way of resistor 75. The anode of tube 73 is connected to B+ terminal 57 by way of resistors 77 and 78. The juncture between resistors 77 and 78 is connected to conductor 61, interconnecting shaper 60 and gate 62, by way of a coupling condenser 79.

The conductor leading from the coupling condenser 59 to the input of shaper circuit 60 is connected by way of conductor 85 to the control grid of a third thyratron 86. The cathode of tube 86 is connected to ground by way of resistor 86a. Resistor 87 serves to connect the screen grid of tube 86 to ground. The anodes of tubes 86 and 73 are interconnected by way of a network including series resistors 88, 89, 90 and 91. Also included in said network are neon discharge tubes 92, 93, 94, and 95. Neon tubes 92 and 93 are connected in series with the cathode of tube 92 connected to the anode of tube 86. The anode of tube 92 is connected to the cathode of tube 93. The polarity of tubes 94 and 95 is opposite that of tubes 92 and 93. The juncture between resistors 88 and 89 is connected directly to the juncture between tubes 92 and 93. Similarly, the juncture between resistors 89 and 90 is connected directly to the juncture between tubes 93 and 94 and also, by way of resistance 96 to a B+ terminal 57. The juncture between resistors 90 and 91 is connected directly to the juncture between tubes 94 and 95. The network comprising elements 88–95 serves to provide an indication as to whether the time break pulse appears first on conductor 50 or on conductor 70 as will now be explained.

More particularly, the counter 40 is actuated to initiate counting of pulses from an independent source contained therein by the application to conductor 61 of a starting pulse. The counting of pulses in counter 40 is terminated by the application of a pulse to conductor 61. Thus, counter 40 will provide an indication or registration of a measure of the time interval between pulses applied to conductor 61. At the same time, tube 93 or tube 94 will provide an indication as to whether the starting pulse is applied to the system by way of conductor 50 or by way of conductor 70. More particularly, assume for the following description that the starting pulse is applied to the time-sensing system by way of conductor 50. Application of such pulse to tube 52 produces a sharp voltage spike at the anode of tube 52 which is applied by way of condenser 59 and shaper 60 to the conductor 61 and the gate 62 thereby to initiate the counting of timing pulses in counter 40. The same pulse from tube 52 transmitted by way of condenser 59 is applied by way of conductor 85 to the control grid of thyratron 86 thereby causing tube 86 to conduct. Conduction through tube 86 causes neon tubes 92 and 93 to fire and become conducting thereby causing a voltage drop across resistor 96 which substantially reduces the voltage appearing at the juncture between tubes 93 and 94. Thus, tube 93 mounted in the face of the counter 40 or otherwise visible in relation to tube 94 will indicate that the pulse initiating the counting operation of counter 40 was derived from conductor 50.

This counting of pulses in counter 40 is terminated on the appearance of a pulse on conductor 70 which is applied by way of capacitor 71 and resistor 72 to the control grid of thyratron 73. Thyratron 73 fires, which abruptly alters the anode voltage thereof to produce a sharp pulse at the juncture between resistors 77 and 78. This pulse is then applied by way of condenser 79 to conductor 61 which terminates the counting of pulses in counter 40. Counter 40 will then retain an indication which may be read on the face thereof as to the number of pulses counted therein. When suitably calibrated in terms of the speed of drums 10–15 there will be provided a direct indication of the adjustment necessary between drums 11 and 12 in order to bring into alignment the time break signals and thus the entire seismograms recorded thereon.

Assume now that the marker signal which starts the counting of pulses on counter 40 appears on conductor 70. This happens when thyratron 73 fires ahead of tube 52 to apply a pulse by way of condenser 79 to gate 62, thus initiating the counting of pulses in counter 40. At the same time, tubes 94 and 95 are caused to conduct, thus abruptly lowering the voltage at the juncture between tubes 93 and 94 so that when tube 86 fires in response to a count-terminating pulse on conductor 50 the tubes 92 and 93 will not be fired, thus the tube 94 in its conducting state will indicate to an observer that the count-initiating marker signal was derived from conductor 70.

An observer noting the time interval indicated on the face of the counter 40 may then make the necessary adjustment both in magnitude and sense by the control knob 36 on drum 12 to bring the records on drums 11 and 12 into time alignment.

In a similar manner there will be provided an indication on counter 41 of the difference in time between pulses on conductor 50 and on conductor 100; an indication on counter 42 of the difference in time between pulses on conductor 50 and on conductor 101; and an indication on counter 43 of the time difference between pulses on conductor 50 and on conductor 102. More particularly, it will be noted that the juncture between condenser 59 and shaper 60 is connected by way of conductor 105 to the input to each of shapers 106, 107, and 108. The terminal between condenser 59 and shaper 60 is also connected by way of conductor 85 to the control grids of tubes 110, 111, and 112. Thus, the control 37 on drum 13 may be adjusted in magnitude depending upon the reading on counter 41. It will be adjusted in sign or sense depending upon whether neon lamp 41a or lamp 41b is conducting. In a similar manner the control knob 38 on drum 14 will be adjusted in magnitude depending upon the reading on counter 42. It will be adjusted in sign or direction depending upon whether indicating lamp 42a or lamp 42b is conducting. Finally, the control knob 39 on drum 15 will be adjusted in magnitude in dependence upon the reading of recorder 43 and in direction or sign depending upon whether the lamp 43a or lamp 43b is conducting.

With the records on drums 11–15 in precise time alignment relative to the pickup heads 21–25, the multi-signal recordings may be reproduced and the amplifier unit 32 energized to transmit to the recording medium on drum 10 a composite multi-signal record.

When the recording of the composite record on drum 10 has been completed, the timing system may be reset by momentary closure of switch 115. Switch 115 is connected to a circuit including a condenser 116 and a series-charging resistor 117 which is connected to the positive terminal 57 of battery 57a. Thus, a charge is stored on condenser 116 during the counting interval. Thereafter, closure of switch 115 applies the potential across condenser 116 to the cathodes of tubes 52, 73, 86, 110, 111, 112, 120, 121, and 122. This abruptly elevates each cathode voltage relative to its associated anode to extinguish conduction, resetting the timing system.

In the system illustrated in FIG. 1, a second group of seismograms to be composited may comprise those signals recorded on the bottom twelve channels on the seismograms on drums 11–15 or entirely separate recordings.

While the foregoing description has been directed to registering an indication as to magnitude and sense of an adjustment necessary for time alignment of two separate seismograms in a playback system, it is to be understood that the time alignment may conveniently be performed automatically. One mode of providing for automatic correction is illustrated in FIGS. 2 and 3.

In FIG. 3, a system is illustrated for automatically adjusting the time alignment as between seismograms on the two drums 11 and 12. It is to be understood that similar systems may be employed for adjusting the remainder of the drums shown in FIG. 1. In FIG. 3, drums 11 and 12 have been shown diagrammatically along with the control circuits partially in block form. Where appropriate, the same reference characters have been used in FIG. 3 as in FIGS. 1 and 2.

Conductor 50 extends from the pickup on drum 11 to a first input terminal 200a of the timing system 200. The sensing circuits of FIG. 1, including tubes 52, 73, and 86, are not shown in detail but are to be understood to form a part of the system of FIG. 3 and to operate in the manner described in connection with FIG. 1 to initiate the operation of the counter 40. More particularly, the shaper 60 is connected by way of conductor 61 to gate 62 which in turn controls transmission of pulses from a source 201 to the input channel 202 of a first decade counter which includes twin triodes 203, 204, 205, and 206. The decade counter operates to provide registration on indicator lamps 211–220 of the number of pulses applied to the input channel 202. The system operates as a decade counter coded to the decimal system in the manner well understood by those skilled in the art. While various specific embodiments of counter systems may be employed, one system which is suitable is manufactured and sold by Hewlett-Packard Company, Palo Alto, California, and is identified as model AC–4A Decade Counter. The output from the last tube 206 is connected by way of conductor 207 to a second decade counter 208 whose output in turn is connected to a third decade 208 and thence to a fourth counter 210. In practice, it has been found desirable to utilize pulses from source 201 at a repetition rate of 1,000 pulses per second so that the indicators 211–220 register time directly in milliseconds. This being the case, indicators 211–220 measure time in terms of from zero to nine milliseconds; decade 208 measures time in terms of from zero to ninety milliseconds; decade 209, from zero to nine hundred milliseconds; and decade 210, in terms of zero to ten seconds.

Characteristic of the counter illustrated in FIG. 3 is the generation of a stair-step voltage which appears on conductor 230. This voltage decreases in steps of 8.4 volts per step with each pulse applied to input channel 202 from approximately 138 volts to 54 volts. The stair-step voltage thus developed is applied by way of resistor 231 to the variable arm 232 on a potentiometer 233. In a similar manner, a stair-step voltage from decade 208 is applied to arm 232 by way of resistor 234. A resistor 235 is connected between the arm 232 and ground. Resistors 231, 234, and 235 are so selected as to apply a voltage to the potentiometer 233 which is proportional to the time interval registered on indicators 211–220 and on similar indicators in decade 208. More particularly, suitable values for the resistors are as follows: resistor 231, 10 meg ohms; resistor 234, 1 meg ohm; and resistor 235, 0.1 meg ohm. Decades 209 and 210 similarly are connected to the potentiometer arm 232 by way of resistors 236 and 237, respectively. In practice however, it has been found necessary to use only two decades since the time breaks generally can be aligned to within less than 100 milliseconds. However, four decades have been shown. By this means, the voltage applied to the potentiometer 233 is inversely proportional to the misalignment between the timing markers on the records on drums 11 and 12. The inverse relationship arises by reason of the fact that the voltage on conductor 230 decreases with the number of pulses on input channel 202.

The extremities of the potentiometer 233 are connected by way of conductors 238 and 239 to the input of a buffer unit 240. The output of unit 240 is applied across a potentiometer 241, the circuits being completed by way of a slip-ring structure 242. The variable tap on potentiometer 241 is connected through slip-ring structure 242 and by way of conductor 243 to the input of a chopper unit 244 whose output in turn is connected to amplifier 245, channel 246, and slip-ring structure 242 to one winding 247 of motor 249. Motor 249 is a two-phase motor forming a part of a servo-system wherein the second winding 248 is connected through slip-ring structure 242 to a source 250 of alternating current. Chopper 244 is designed to operate at the same frequency as the output from source 250 thereby to control the position of the rotor of motor 249. Motor 249 is coupled mechanically to the variable tap on potentiometer 241 and also to the worm gear 12f associated with drum 12. Worm gear 12f serves to rotate drum 12 relative to shaft 15 and thus relative to drum 11. The structure of the mechanical couplings illustrated in FIG. 3 may be as shown in detail in FIG. 2.

A voltage bucking circuit is connected in parallel with potentiometer 233 and includes a variable resistor 260 connected to two terminals of a double-pole, double-throw, relay-operated switch 261. The remaining two terminals of switch 261 are connected to the terminal of resistor 233 by way of conductor 262. The armatures 263 and 264 of switch 261 are connected to the positive and negative terminals, respectively, of a battery 265. A relay coil 266 mechanically coupled to armatures 263 and 264 is connected in series with the anode of tube 86. Tube 86 is to be understood to function the same as in the circuit of FIG. 1 and for this reason has been illustrated in fragmentary form showing only its relationship with respect to the relay coil 266. Conductors 267 and 268 provide the necessary circuitry for such structural relationship.

In operation, motor 17 is energized to drive drums 11 and 12 cyclically past the associated pickup heads. Time break signals will by this means be repeatedly applied to the unit 200 by way of conductors 50 and 70. Assuming that the time break signal from drum 11 initiates counting operations, a voltage is developed in the decade counters and appears across resistor 235 which is inversely proportional to the time interval between the time breaks appearing on conductors 50 and 70. This voltage is then applied to potentiometer 233 and thence to buffer unit 240. Buffer unit 240 serves to convert the stair-step voltage which decreases with time in the interval between the control pulses from drums 11 and 12 to a voltage concomitantly increasing with time. Such voltage is then applied across the extremities of potentiometer 241. A portion of this voltage, depending upon the magnitude of the time difference and the position of the tap on potentiometer 241, is applied to chopper 244, amplifier 245, and winding 247. Thus energized, motor 247 tends to balance the servo loop. When, upon repeated cycling of drums 11 and 12, indicators 211–220, etc. indicate a zero time difference, correction having been made automatically by motor 249, an operator will then be informed that the records on drums 11 and 12 may be composited with reliable phase relationships therebetween.

In the event that the count-initiating signal is derived from drum 12 rather than from drum 11, tube 86 will be fired in the manner described in connection with FIG. 1, thereby energizing relay coil 266. Responsive thereto, armatures 263 and 264 will be moved to the bottom terminals to reverse the polarity of the voltage from battery 265 applied across potentiometer 233. This reversal in polarity, suitably proportioned as well understood by those skilled in the art, reverses the direction of the corrective action from motor 249 properly to align the seismograms on drums 11 and 12.

It should be noted that in FIG. 2 there is illustrated a slip-ring structure in which seven slip rings are employed to complete the seven circuits which extend between motor 249 and potentiometer 241 and the voltage sources therefor.

Thus, from the foregoing, it will be seen that a system is provided which will indicate to an operator the magnitude and the sense of misalignment so that manual adjustment can be made as explained above in connection with FIGS. 1 and 2. Furthermore, the system permits automatic adjustment of the drums if misalignment initially is present.

Thus, there is provided a system in which the difference in time between timing markers from two reproducible records is registered indicating to an operator the magnitude of adjustment necessary for precise time alignment. It will be appreciated that with such an indication an operator may determine the sense or direction of misalignment by making the indicated adjustment between the two seismograms regardless of direction and then providing a second indication on a subsequent cycle of reproduction. The adjustment will either have provided accurate time alignment between time breaks or will have doubled the amount of misalignment. In the latter case, both sense and magnitude are then known. However, in a preferred embodiment of the invention an indication is provided not only as to the magnitude of misalignment but a cooperating indication as to the sense or direction thereof. In still a further aspect of the invention, provision is made for automatically correcting misalignment.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In a system for compositing a plurality of seismic signals separately recorded in reproducible form on compatible time scales, and each having a time break the combination which comprises reproducing means for cyclically generating a first timing signal representative in time of a reference time break, reproducing means for cyclically generating a second timing signal representative in time of the time break for one of said seismic signals, a timing circuit including a counter having an input terminal connected to both said reproducing means for generating a condition proportional to the time interval between the appearance at said input terminal of said first timing signal and said second timing signal, sensing means in said circuit having two input terminals one of which is connected to a first of said reproducing means and the other of which is connected to the second of said reproducing means for indicating the time sequence of said first signal and said second signal, and means in said circuit for indicating the magnitude of said conditon whereby adjustment may be made in said reproducing means in proportion to said indication for alignment of said time breaks.

2. In a system for compositing two seismic signals separately recorded in reproducible form each in relation to a time break on compatible time scales, the combination which comprises reproducing means for generating a timing signal bearing a predetermined time relation with respect to reproduction of the time break for the first of said seismic signals, reproducing means for cyclically generating a timing signal bearing a predetermined time relation with respect to reproduction of the time break for the second of said seismic signals, a pair of indicators, a circuit interconnecting said reproducing means and said indicators for selectively actuating one or the other of said indicators in response to the first to occur of the timing signals, and means in said circuit for preventing actuation of either of said indicators in response to the last to occur of said timing signals.

3. In a system for compositing two seismic signals separately recorded in reproducible form each in relation to a time break on compatible time scales, the combination which comprises reproducing means for cyclically generating a first timing signal bearing a predetermined time relation with respect to reproduction of the time break for the first of said seismic signals, reproducing means for cyclically generating a second timing signal bearing a predetermined time relation with respect to reproduction of the time break for the second of said seismic signals, a time scaling circuit having an input terminal, a first signal channel interconnecting the first of said reproducing means and said input terminal to initiate operation of said time scaling circuit, a second signal channel interconnecting the second of said reproducing means and said input terminal to terminate operation of said time scaling circuit thereby to provide an indication of the magnitude of the time interval between said first timing signal and said second timing signal, and a circuit including indicating means connected to both of the signal channels and responsive only to the first to occur of the timing signals for indicating the sequence thereof.

4. A system for determining the interval and sequence between two timing signals appearing on a first signal channel and a second signal channel respectively, which comprises a gas discharge tube connected to said first channel and adapted to begin conduction in response to a timing signal on said first channel, a second gas discharge tube connected to said second channel and adapted to begin conduction in response to a timing signal on said second channel, a timing circuit, circuit connections between both of said discharge tubes and said timing circuit adapted to initiate and to terminate operation of said timing circuit in response to the initiation of conduction in one of said tubes and to the initiation of conduction in the other of said tubes respectively, a sequence circuit interconnecting the output circuits of said tubes including two indicators one of which may be actuated upon initiation of conduction in one of said tubes and the other of which may be actuated upon initiation of conduction in the other of said tubes, and a control circuit interconnecting the outputs of said tubes for preventing concurrent actuation of said indicators whereby said timing circuit will indicate the magnitude of the time interval between sad timing signals and said indicators selectively actuated by said timing signals will indicate the time sequence thereof.

5. A system for determining the interval and sequence between two timing signals appearing on a first signal channel and a second signal channel respectively, which comprises a gas discharge tube connected to said first channel and adapted to begin conduction in response to a timing signal on said first channel, a second gas discharge tube connected to said second channel and adapted to begin conduction in response to a timing signal on said second channel, a timing circuit, circuit connections between both of said discharge tubes and said timing circuit adapted to initiate and to terminate operation of said timing circuit in response to the initiation of conduction in one of said tubes and to the initiation of conduction in the other of said tubes respectively, a secquence circuit interconnecting the output circuits of said tubes including two indicators one of which may be actuated upon initiation of conduction in one of said tubes and the other of which may be actuated upon initiation of conduction in the other of said tubes, and a control circuit interconnecting the outputs of said tubes and responsive to actuation of one of said indicators for preventing concurrent actuation of the other of said indicators whereby said timing circuit will indicate the magnitude of the time interval between said timing signals and said indicators selectively actuated by said timing signals will indicate the time sequence thereof.

6. A system for determining the interval and sequence between two timing signals appearing on a first signal channel ad a second signal channel respectively, which comprises a gas discharge tube connected to said first channel and adapted to begin conduction in response to a timing signal on said first channel, a second gas discharge tube connected to said second channel and adapted to begin conduction in response to a timing signal on said second channel, a timing circuit, circuit connections between both of said discharge tubes and said timing circuit adapted to initiate and to terminate operation of said timing circuit in response to the initiation of conduction in one of said tubes and to the initiation of conduction in the other of said tubes respectively, a third gas discharge tube connected to said first tube and adapted to begin conduction wtih said first tube, a sequence circuit interconnecting the output circuits of said second and third tubes including two indicators one of which may be actuated upon initiation of conduction in one of said second and third tubes and the other of which may be actuated upon initiation of conduction in the other of said second or third tubes, and a control circuit interconnecting the outputs of said second and third tubes for preventing concurrent actuation of said indicators whereby said timing circuit will indicate the magnitude of the time interval between said timing signals and said indicators selectively actuated by said timing signals will indicate the time sequence thereof.

7. In a system for compositing two seismic signals separately recorded in reproducible form each in relation to a time break and on compatible time scales, the combination which comprises reproducing means for cyclically generating voltages representative of said two seismic signals and concurrently for generating a first timing signal representative in time of the time break for the first of said seismic signals and a second timing signal representative in time of the time break for the second of said seismic signals, circuit means for combining said voltages to form a composite thereof, a recording channel adapted to be connected to said circuit means for providing a record of said composite signal, a timing-sequence circuit including three controllers, a first of said controllers being connected to one of said reproducing means and operable in response to one of said timing signals for generating a control pulse, connections between the second of said reproducing means and a second of said controllers operable in response to one of said timing signals for generating a control pulse, a time interval indicator, circuit means interconnecting both said controllers and said indicator for starting and stopping said indicator in response to the first and second in occurrence of said control pulses respectively, a circuit interconnecting the first and the third of said controllers and adapted to generate a third control pulse in response to said first control pulse, a sequence-indicating circuit interconnecting said second and said third controllers and including a pair of indicators, and a control circuit interconnecting said second and said third controllers and said indicators for preventing actuation of either of said indicators in response to the last to occur of said second and said third pulses.

8. In a system for compositing two seismic signals separately recorded in reproducible form each in relation to a time break and on compatible time scales, the combination which comprises reproducing means for synchronously and cyclically generating voltages representative of said two seismic signals and concurrently for generating a first timing signal representative in time of the time break for the first of said seismic signals and a second timing signal representative in time of the time break for the second of said seismic signals, circuit means for combining said voltages to form a composite thereof, a recording channel adapted to be connected to said circuit means for providing a record of said composite signal, a timing-sequence circuit connected to both said reproducing means and including three thyratron circuits, a first of said thyratron circuits being connected to one of said reproducing means and operable in response to one of said timing signals for producing current flow to generate a control pulse, connections between the second of said reproducing means and a second of said thyratron circuits operable in response to one of said timing signals for producing current flow to generate a control pulse, a time interval indicator, circuit means interconnecting both of said thyratron circuits and said indicator for starting and stopping said indicator in response to the first and second in occurrence of said control pulses respectively, a circuit interconnecting the first and third of said thyratron circuits for producing current flow to generate a third control pulse in response to said first control pulse, a sequence-indicating circuit interconnecting said second and said third thyratron circuits and including a pair of indicators, and a control circuit interconnecting said second and said third thyratron circuits and said indicators for preventing actuation of either of said indicators in response to the last to occur of said second and said third control pulses.

(References on following page)

References Cited by the Examiner

UNITED STATES PATENTS

| | | | |
|---|---|---|---|
| 2,795,287 | 6/57 | Sharpe | 181—0.5 |
| 2,858,523 | 10/58 | Hawkins. | |
| 2,888,663 | 5/59 | Blake et al. | 181—0.5 X |
| 2,950,459 | 8/60 | Loper et al. | 181—0.5 X |
| 2,980,884 | 4/61 | Kaasa | 340—15.5 |
| 3,041,578 | 6/62 | Elliott | 340—15.5 |
| 3,110,878 | 11/63 | Horeth et al. | 340—15.5 |

OTHER REFERENCES

Millman and Taub: Pulse and Digital Circuits, McGraw-Hill Book Co., 1956, page 411.

SAMUEL FEINBERG, *Primary Examiner.*

CHARLES W. ROBINSON, CHESTER L. JUSTUS, *Examiners.*